(12) United States Patent
Sturman et al.

(10) Patent No.: US 7,431,262 B2
(45) Date of Patent: Oct. 7, 2008

(54) DIGITAL REGULATORS

(75) Inventors: Oded Eddie Sturman, Woodland Park, CO (US); Jeffrey T. Gardner, Woodland Park, CO (US); Timothy P. Kranz, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 163 days.

(21) Appl. No.: 11/545,934

(22) Filed: Oct. 10, 2006

(65) Prior Publication Data

US 2007/0120082 A1     May 31, 2007

Related U.S. Application Data

(60) Provisional application No. 60/726,516, filed on Oct. 12, 2005.

(51) Int. Cl.
*F16K 31/02* (2006.01)
(52) U.S. Cl. .............. 251/129.09; 251/129.16; 335/299
(58) Field of Classification Search ............ 251/129.09, 251/129.15, 129.16; 335/299
See application file for complete search history.

(56) References Cited

U.S. PATENT DOCUMENTS

| | | | | |
|---|---|---|---|---|
| 2,587,356 A | * | 2/1952 | McPherson | ................. 137/613 |
| 4,664,355 A | * | 5/1987 | Kubach | ....................... 251/65 |
| 4,899,785 A | | 2/1990 | Inokuchi | |
| 4,922,121 A | * | 5/1990 | Taft | ......................... 303/115.2 |
| 5,002,091 A | | 3/1991 | Inokuchi | |
| 5,035,360 A | * | 7/1991 | Green et al. | ............. 239/585.3 |
| 6,109,284 A | | 8/2000 | Johnson et al. | |
| 6,496,092 B1 | * | 12/2002 | Schnatterer et al. | ......... 335/220 |

OTHER PUBLICATIONS

Hydraforce, EHPR98-T33 Proportional Reducing/Relieving Data Sheet, undated, pp. 2.971.1-2.971.2.
Eaton Vickers, Proportional Pressure Reducing Valves Technical Catalog, May 2003, pp. 1-14.

* cited by examiner

*Primary Examiner*—John K. Fristoe, Jr.
(74) *Attorney, Agent, or Firm*—Blakely Sokoloff Taylor & Zafman LLP

(57) ABSTRACT

Digital regulators using a plurality of latching solenoid actuators, each having a spring return, the springs being configured to provide a force on the valve member of a regulator, when the solenoid actuators are unlatched, in a binary progression. The solenoid actuators are selectively latched by an latching current pulse and retained in the latched condition by residual magnetism in a zero air gap magnetic circuit. Various embodiments are disclosed, including embodiments having the solenoid actuators side by side and in a stacked relationship, solenoid actuators having springs providing a spring force in a binary progression, solenoid actuators having equal springs and distributed in a binary progression from a hinge axis, and solenoid actuators not distributed in a binary progression from a hinge axis and not distributed in a binary progression from the hinge axis. Embodiments are also disclosed having the capability of interpolating between binary settings of the digital regulator.

27 Claims, 4 Drawing Sheets

DIGITAL REGULATORS

CROSS-REFERENCE TO RELATED APPLICATION

This application claims the benefit of U.S. Provisional patent application No. 60/726,516 filed Oct. 12, 2005.

BACKGROUND OF THE INVENTION

1. Field of the Invention

The present invention relates to the field of electro-proportional valves.

2. Prior Art

Electro-proportional valves are well known in the prior art. These valves provide electrically variable pressure regulation responsive to an input current. By way of example, Hydraforce, Inc. of 500 Barclay Blvd, Lincolnshire, Ill. manufactures Proportional Pressure Control, Reducing/Relieving, direct-Operated valves of this type, such as their EHPR98-T33 valves. These valves are direct-operated or single stage valves. Two stage valves of this general type are also commercially available, such as the Proportional Pressure Reducing Valves available from Eaton Vickers of 14615 Lone Oak Road, Eden Prairie, Minn. Whether single stage or two stage, such valves generally balance the magnet force generated by a solenoid within the valve with a pressure feedback to control the pressure. The HydraForce valves referred to are drop-in valves, meaning that the valves include a valve spool and are adapted to drop into a valve body provided by their customer, whereas the Vickers valves referred to are complete valve units.

The primary disadvantage of the prior art valves of this general type is that the solenoid utilized to control the force balance on the flow control spool requires a continuous electrical current in order to generate force and thus regulate pressure. This is inefficient and generates unnecessary heat. Heating of the solenoid changes the electrical resistance and creates hysteresis in the commanded pressure versus current relationship for the valve. Heat introduced into the working fluid by the valve must be removed from the fluid elsewhere in the system, increasing the system's cooling requirements.

DETAILED DESCRIPTION OF THE PREFERRED EMBODIMENTS

The preferred embodiments of the present invention comprise replacements for the solenoid in prior art proportional valves, and may be incorporated in prior art valves with substantially no change to the valve itself. Thus valve in accordance with the present invention regulate fluid pressure to an electrically commanded value. This is achieved using magnetically latching actuators rather than a solenoid to set the commanded pressure. The latching actuators are actuated and released using short current pulses, thereby significantly reducing the electrical energy required to maintain the pressure setting. This reduces valve and working fluid heating.

Figure 1:
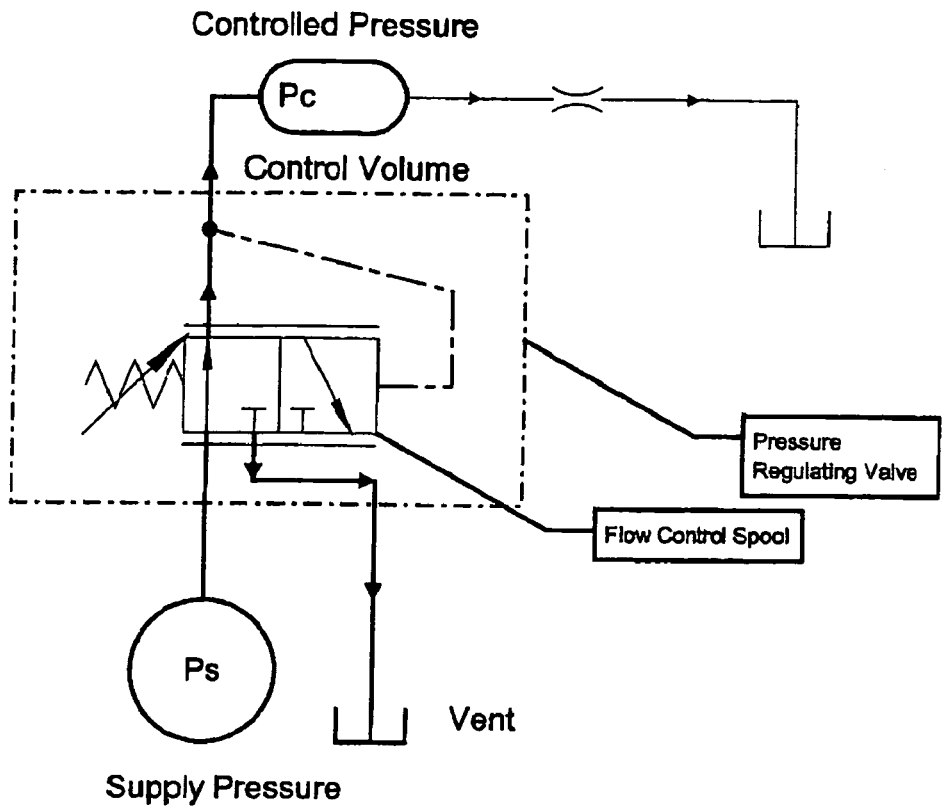
FIG. 1 is a schematic diagram of a system using the present invention.

As shown in FIG. 1, a source Ps provides fluid under pressure, with the pressure in the volume Pc downstream of the pressure regulating valve being maintained to an electrically commanded value by the pressure regulating valve. The pressure regulating valve controls the flow of fluid into and out of the control volume Pc by adjusting the position of the flow control spool. In a single stage device, the position of the flow control spool is determined by a force balance between the control pressure acting on the end of the spool, the variable force generated by the solenoid, and the spring force. The commanded pressure is set by varying the control current to the solenoid.

The present invention function is very similar to the prior art described herein, with the following exception. Rather than using a solenoid to vary the force balance on the flow control spool, a series of magnetically latching electromagnetic actuators are utilized to deactivate and activate parallel springs pushing on one end of the flow control spool. This effectively creates a spring with variable rate and preload. By selecting the combination of springs that are active, the control pressure can be commanded electrically.

If the spring preloads and/or spring rates are selected in the following ratios: $1, 1/2, 1/4, \ldots 1/2^n$ where $n=1,2,3\ldots$ to the number of parallel actuators, then there are $2^n$ distinct control pressure settings available for the valve. The design shown FIG. 2 has 4 electromagnetic actuators, so it would be capable of 16 different evenly spaced pressure settings, including 0.

One or more of the parallel springs can be deactivated by sending a short current pulse through the electromagnetic actuator(s). The actuator compresses the spring, pulling it away from the end of the flow control spool. When the actuator has reached full stroke, the current is removed and the actuator is held in position using residual magnetism. Removing this spring reduces the total preload and or spring rate applied to the end of the flow control spool, causing the force balance to change, moving the spool to a different equilibrium position. When the spring must be reengaged, a short reverse current is passed through the actuator to de-latch it.

The primary advantage of this invention is that current is not required to maintain a given state. This reduces valve and working fluid heating and produces a valve with no heat related input to output hysteresis. The valve also has high electrical efficiency. Since the actuators consume less power than a solenoid, they can be made much smaller so the valve can be made much smaller and easier to package.

Figure 2:
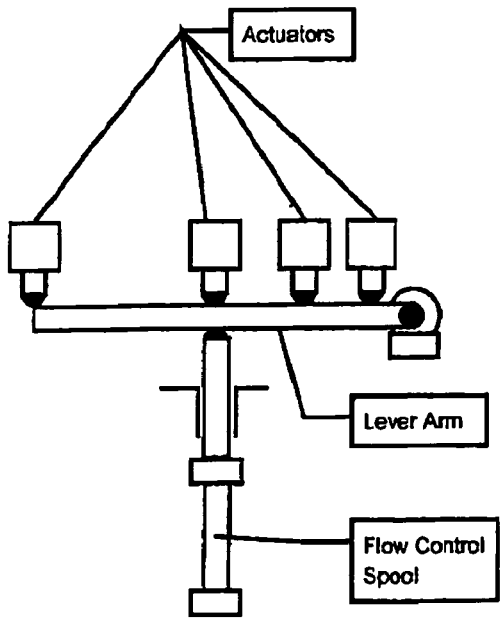
FIG. 2 is a schematic representation of one embodiment of the present invention.

Rather than having a number of actuators controlling springs with different rates and/or preloads, identical springs and actuators can be placed at varying positions along a lever arm to vary their relative effect on the flow control spool. Such an arrangement is illustrated in FIG. 2.

Figure 3:
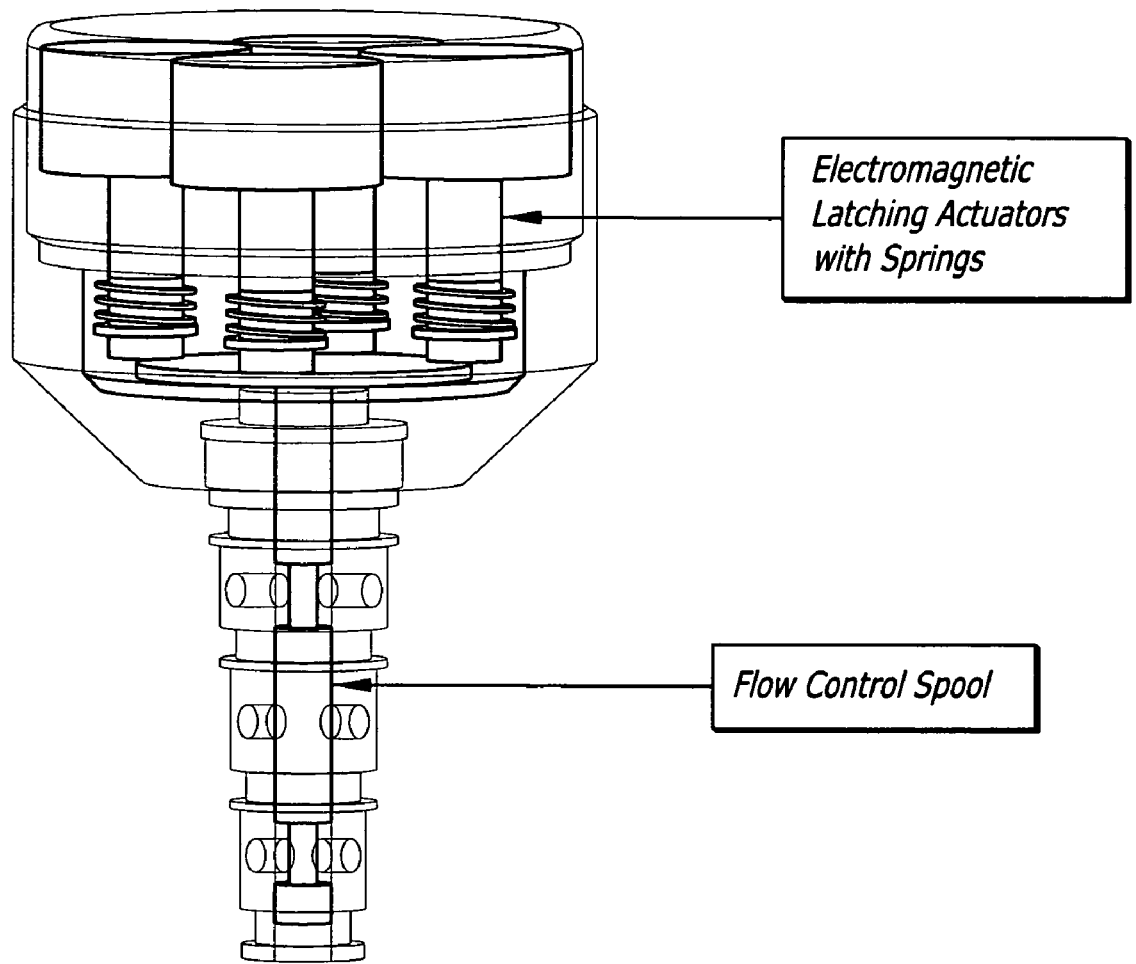
FIG. 3 is a view of a drop-in embodiment of the present invention.

If finer pressure control is required, pulse width modulation of the current on the actuator with the smallest pressure valve increment could be used rather than simple "on-off"

control. Alternatively, the actuator with the finest control increment could use a variable current as in the prior art, instead of being magnetically latching, though because the required solenoid force needed is only some small part of the total, the power consumption and heating would also be only a small fraction of that of the prior art devices. Such an embodiment could provide variability not limited by the number of actuators used. A drop-in embodiment of the present invention is shown in FIG. 3.

The new feature of the present invention is using latching actuators to deactivate springs in order to change the force balance on a pressure balanced valve rather than using a solenoid to accomplish the same task. In embodiments using direct action of the springs rather than a lever, the springs could provide spring forces in the ratio of $1, 1/2, 1/4, \ldots 1/2^n$, for n actuators. However the springs might be used in actuators that themselves might be provided in a substantially lesser number of sizes, as the actuators themselves only provide the function of deactivation of the springs. Also while the invention has been described with respect to single stage electro-proportional valves, it will be obvious to those skilled in the art how to adapt the invention to multiple stage electro-proportional valves.

Figure 4:
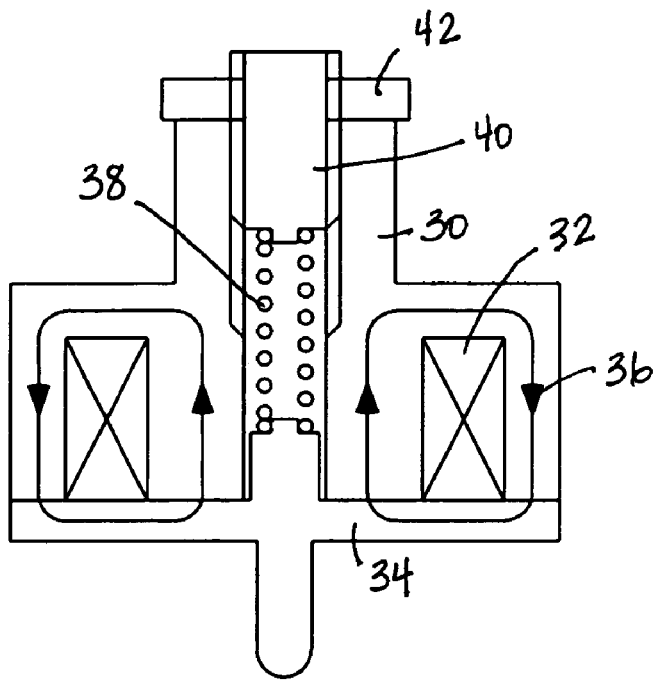
FIG. 4 is a schematic cross section of an exemplary latching solenoid that may be used in the present invention.

A cross-section of an exemplary latching solenoid actuator that may be used with the present invention may be seen in FIG. 4. As shown in this Figure, a stationary magnetic member 30 has a coil 32 therein to magnetize the magnetic circuit consisting of the stationary magnetic member 30 and the moveable magnetic member 34. The latching actuator is illustrated in the latched condition wherein the residual magnetism remaining after a current pulse in coil 32 is terminated maintains a sufficient magnetic field, indicated by arrow 36, to maintain the moveable magnetic member 34 flat against the stationary magnetic member 30 against the force of spring 38. In that regard, the spring force and pre-load on spring 38 is selected so that when the moveable magnetic member 34 is released from the stationary magnetic member 30 by a current pulse having an opposite magnetic sense from the latching pulse to substantially demagnetize the stationary magnetic member 30 and the moveable magnetic member 34, the moveable magnetic member 34 will move downward to provide a force of the desired amount against the spool. In this embodiment the spring force at the desired extension of moveable magnetic member 34 is adjustable by the adjustment screw 38 which, after adjustment, is locked in position by lock nut 42. In general, no permanent magnet is required, as when actuated, the moveable magnetic member 34 and the stationary magnetic member 30 form a zero air gap magnetic circuit, so that the retentivity of ordinary soft (non-permanent) magnetic materials is adequate to provide a good holding force with a zero air gap magnetic circuit, yet to not maintain any substantial magnetic field to provide a significant force on the moveable magnetic member when the solenoid actuator is unlatched. As used herein, a zero air gap magnetic circuit means a magnetic circuit with no intentional non-magnetic gaps, or at least no intentional non-magnetic gaps adequate to avoid latching by the residual magnetism of the soft magnetic materials used.

The current pulse to release moveable magnetic member 34 from the latched position shown in FIG. 4 will be a current pulse of a substantially lower magnetizing force than the current pulse used to actuate and latch the latching actuator, and will be in an opposite magnetic sense to the latching current pulse. In that regard, the release pulse may be a current pulse of opposite polarity in the same coil as was used for actuating and latching the actuator, or alternatively, may be a current pulse with an magnetizing sense in a second coil provided for that purpose. In that regard, a single coil has the advantage of greater simplicity in the winding and of being able to use the entire winding volume for that single coil, whereas a two coil system has the advantage that the two coils may have an opposite winding sense and a common ground so that both the actuating and the release current pulses are positive voltage input pulses.

Figure 6:
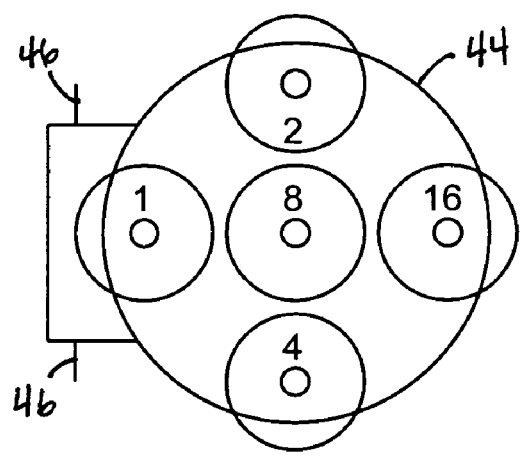
FIG. 6 illustrates still another exemplary side be side distribution of solenoid actuators operative on a hinged member that may be used in the present invention.

A top view of a combination of five solenoid actuators 42 distributed around and disposed to be capable of pushing against a plate 44 fastened to the spool of the proportional control valve controlled thereby may be seen. While the actuators provide force levels in the relative values of 1, 2, 4, 8 and 16, only the center actuator (force level 16) would be coaxial with the spool, the other actuators providing an undesired off-center force. Also, while all actuators are shown as being the same physical size, this Figure is schematic only and the actuators may or may not actually be the same size. As an alternative shown in FIG. 6, plate 44 may hinged to the housing of the valve on hinges 46, schematically illustrated in the Figure. Now plate 44 need only be in contact with the spool, not fastened to the spool, so as to provide very little, if any side force on the spool. Accordingly, while the actuators are still indicated as providing relative forces of 16, 8, 4, 2 and 1, these relative forces refer to the relative forces provided to the spool and are not necessarily the relative forces of the springs in the actuators. By way of example, the actuator providing a relative force of 16 on the spool is at a greater distance from the hinges 46 than the actuator providing a relative force of 8 on the spool. Accordingly, the force of the springs in these two actuators would not be 2:1, but some ratio less than 2:1. The force of the actuators indicated as providing relative forces of 2, 4 and 8 on the spool would have springs with the same relative forces, though the actuator with a relative force of 1 might, in fact, have a stronger spring than the actuator providing a relative force of 2 on the spool because of its being positioned at less than one-half the distance from the hinge 46 of the actuator providing a relative force of 2.

Figure 7:
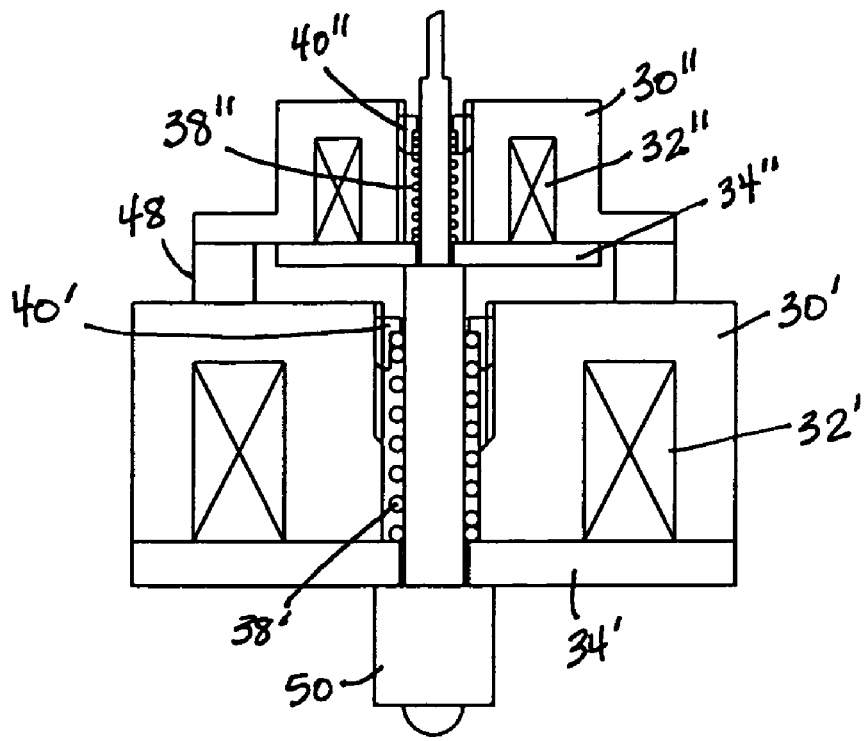
FIG. 7 is a cross section of part of stacked solenoid actuators in accordance with the present invention.

Now referring to FIG. 7, a diagram illustrated stacked solenoids may be seen. As shown in this Figure, a first solenoid has a stationary magnetic member 30', a moveable magnetic member 34', a coil 32' (one or two coils), a spring 38' and a spring force adjustment member 40'. A spacer 48, preferably but not necessarily a non-magnetic spacer, provides space for motion of moveable magnetic member 34" of a second actuator thereabove comprising stationary magnetic member 30", the moveable magnetic member 34", a coil 32" (again one or two coils), a spring 38" and a spring force adjustment member 40". An actuator shaft 50 extends through each moveable magnetic member without being fastened thereto, with the springs 38', 38" etc. acting on the moveable magnetic members so that the total force on the actuator shaft 50 will be equal to the total spring force of those actuators which are released (not latched). While two such stacked actuators are illustrated in FIG. 7, obviously a greater number of actuators may be similarly stacked, the actuators being of the same or different sizes as desired.

In addition, note that while the two stacked solenoid actuators illustrated in FIG. 7 are of different size, they could well be the same size, differing only in the springs therein, and perhaps the coils therein because of the lower force needed to latch the solenoid actuator with the lower spring force allowing the use of a lower energy pulse to latch that actuator. Finally note that one may use a combination of solenoid actuators, some stacked and some side by side. For instance, referring again to FIG. 2, instead of four solenoid actuators spaced in a binary progression from the hinge axis, one could use two stacked pairs of solenoid actuators, the first stacked pair being located a predetermined distance from the hinge axis, and the second stacked pair that same predetermined distance from the first stacked pair, or twice the predetermined distance from the hinge axis. With such an arrangement, the first stacked actuator pair may provide relative spring forces of 1 and 2, and the second stacked actuator pair relative spring forces of 2 and 4, whereby all actuators may reasonably be identical except for some of the springs therein and except for the fact that two different sizes of openings in the different moveable members are needed.

Figure 5:
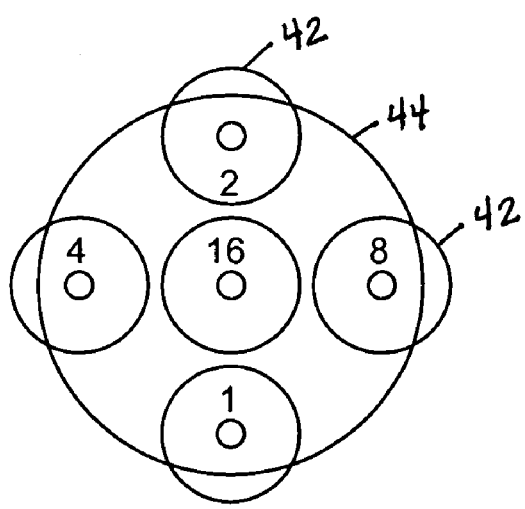
FIG. 5 illustrates another exemplary side be side distribution of solenoid actuators that may be used in the present invention.

Thus in the embodiments of the present invention, the spring in each solenoid may cause a respective force on the proportional valve member (typically a spool) such that the respective forces on the valve member are in a binary progression, 1, 2, 4 ... $2^{n-1}$, where n is the number of solenoid actuators used. In various embodiments, the spring in the actuators will provide spring forces in the binary progression (FIGS. 5 and 7), spring forces that are equal in actuators spaced in a binary progression (FIG. 2), spring forces that are not equal nor in a binary progression (FIG. 6) and spring forces from actuators that are positioned side by side (FIGS. 2, 5 and 6) or are in a stacked relationship (FIG. 7), or a combination of side by side and stacked relationship.

Also, techniques were hereinbefore described to obtain finer pressure control, if required, than a particular plurality of solenoid actuators would provide. These techniques involve the use of the actuator with the smallest proportional valve increment. However other techniques may be desirable or necessary for various reasons. By way of example, in a 4 solenoid actuator system, each providing a relative force on the proportional valve spool of 1, 2, 4 and 8, if a relative force of 9.5 was commanded, then the smallest proportional valve increment solenoid actuator would be steadily unlatched, and thus not available to provide finer pressure control. Accordingly in this situation, the solenoid actuator with the smallest proportional valve increment that is not steadily unlatched or released to provide the closest lower approximation of the commanded pressure may be unlatched and controlled to provide the fractional relative force to obtain the finer pressure control. Alternatively in this example, the solenoid actuator with a relative force of 1 may be left latched, the solenoid actuator with a relative force of 2 unlatched, and that solenoid actuator given a current to overcome one fourth of its spring force (leaving three fourths of its spring force active. As another example, assume that a pressure is commanded that requires a relative force of 8.95. Here the solenoid actuator with the smallest proportional valve force increment would be available for providing the finer pressure control. However, the 0.95 may be too close to the actual latching force for that solenoid actuator, and accordingly, might result in an inadvertent latching of the actuator, resulting in a loss of further use of that actuator until intentionally unlatched. Accordingly, even when the solenoid actuator with the smallest proportional valve force increment is available, it might be better in at least some situations to provide the finer control to the solenoid actuator with the next smallest proportional valve force increment that is not in fulltime use to provide the closest lower approximation of the pressure commanded. This would still require much less power than current control in the single solenoid system of the prior art and would not risk inadvertent latching of the finer control actuator, as the maximum force used would be less than one-half of that required to latch that actuator, one-fourth the force necessary to latch the actuator if the actuator of a relative force of 4 were used for the finer control, etc. Thus one could unlatch one or more solenoid actuators to overshoot the commanded force by at least some fraction of the least significant relative force and then adjust that force accordingly, or alternatively, particularly if that fraction would be too small, one would instead unlatch one or more solenoid actuators to overshoot the commanded force by more than the least significant relative force and then adjust that force accordingly to provide a margin of safety against inadvertent latching.

Figure 8:
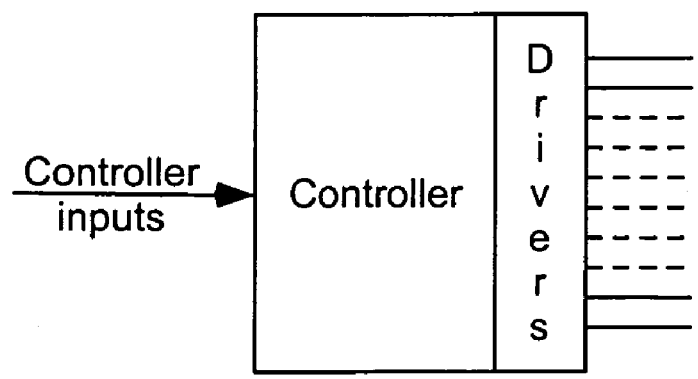
FIG. 8 is a block diagram of a controller for the present invention.

FIG. 8 is a block diagram of a simple controller (single chip computer or multiple chip device with processor, RAM and ROM) that may be programmed to respond to controller inputs and function as described above. Such a controller may control single coil or two coil solenoid actuators, though for a single coil solenoid actuator, the drivers are more complicated as they must be able to provide current pulses of either polarity and of unequal amplitude, as the unlatching (releasing) pulse need only approximately demagnetize the magnetic circuit, not saturate the same in the reverse direction.

In the preferred embodiments, as described, latching is achieved by the use of residual magnetism (resulting from the hysteresis in the B-H curves of the magnetic material used). However it should be noted that one may also drop the relatively high actuating current pulse to a much lower holding current in one or more of the solenoid actuators after pulsing to actuate the solenoid actuator to enhance the latching force, if desired. Such holding current may be a small fraction (perhaps 5% or less) of the current in the latching current pulse required to latch the solenoid actuator because of the zero air gap when latched, so would not present a significant energy dissipation. The holding current in effect increases the residual magnetism by maintaining the magnetic flux density at a higher point on the hysteresis curve after the latching current pulse drops to the holding current level. In that regard, residual magnetism as used herein and in the claims refers to the magnetic field remaining after removal of the actuating current pulse due to the retentivity of the stationary magnetic member and the moveable magnetic member, either alone or as augmented by a relatively small holding current.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. In a proportional valve, the improvement comprising:
  a digital forcer having a plurality of solenoid actuators, each having a stationary member, a moveable member, at least one solenoid coil and a return spring, the stationary member and moveable member, when the moveable member is in a first position, defining a zero air gap magnetic circuit, the spring being disposed to urge the moveable member away from the first position, the moveable member moving to the first position in response to a latching current pulse in one of the solenoid coils of a first magnetic sense, and being retained in the first position after termination of the latching current pulse by residual magnetism until released by a releasing current pulse in one of the solenoid coils of a second magnetic sense opposite the first magnetic sense;
  a valve member;
  the plurality of solenoid actuators being disposed and configured so that the spring in each solenoid actuator will cause a respective force on the valve member when the respective moving member is released;
  the forces exertable on the valve member by each spring being a respective one of a relative force in a binary sequence of relative forces.

2. The improvement of claim 1 wherein when the respective moving member is released, the force of the respective spring is communicated directly to the valve member, the force of each spring being a respective one of a relative force in a binary sequence of relative forces.

3. The improvement of claim 1 wherein the solenoid actuators are disposed to controllably apply a respective spring force to a hinged member, the hinged member being disposed to apply force to the valve member and hinged about a hinge axis perpendicular to and spaced from an axis of the valve member, the solenoid actuators being distributed from the hinge axis by distances in a binary sequence of relative distances, the force that may be exerted on the valve member by each spring being equal.

4. The improvement of claim 1 wherein the solenoid actuators are disposed to controllably apply a respective spring force to a hinged member, the hinged member being disposed to apply force to the valve member and hinged about a hinge axis perpendicular to and spaced from an axis of the valve member, the solenoid actuators being distributed from the hinge axis by distances not all in a binary sequence of relative distances.

5. The improvement of claim 1 wherein the solenoid actuators are disposed in a side by side relationship.

6. The improvement of claim 1 wherein at least some of the solenoid actuators are disposed in a stacked relationship, the moving members of the actuators being disposed relative to a common actuator shaft to apply the respective spring force to the common actuator shaft when the respective moving member is released and to not apply the respective spring force to the common actuator shaft when the respective solenoid actuator is latched.

7. The improvement of claim 1 further comprising an adjustment in each solenoid actuator for adjusting the respective spring force.

8. The improvement of claim 1 further comprised of a controller, the controller configured to receive digital force control inputs and release solenoid actuators to provide forces on the valve member approximating the forces corresponding to the digital control inputs.

9. The improvement of claim 8 wherein the controller is configured to provide releasing current pulses to respective solenoid actuators to release the respective moveable members to provide forces on the valve member approximating the forces corresponding to the digital control inputs, and to provide latching current pulses as required to latch the remaining solenoid actuators.

10. The improvement of claim 9 wherein the controller is configured to pulse respective solenoid actuators to provide releasing pulses to the respective moveable members to provide forces on the valve member exceeding the forces corresponding to the digital control inputs by at least a fraction of the least significant relative force, and to apply a current to at least one of the solenoid actuators to overcome the difference between the forces provided and forces corresponding to the digital control inputs.

11. The improvement of claim 9 wherein the controller is configured to pulse respective solenoid actuators to release the respective moveable members to provide forces on the valve member exceeding the forces corresponding to the digital control inputs by at least more than the least significant relative force, and to apply a current to at least one of the solenoid actuators to overcome the difference between the forces provided and forces corresponding to the digital control inputs.

12. The improvement of claim 8 further comprising a proportional valve body.

13. The improvement of claim 1 wherein the residual magnetism is augmented by a small holding current relative to the current in the latching current pulse.

14. The improvement of claim 1 wherein the residual magnetism is not augmented by a holding current.

15. A proportional valve comprising:
a digital forcer having a plurality of solenoid actuators, each having a stationary member, a moveable member, at least one solenoid coil and a return spring, the stationary member and moveable member, when the moveable member is in a first position, defining a zero air gap magnetic circuit, the spring being disposed to urge the moveable member away from the first position, the moveable member moving to the first position in response to a latching current pulse in one of the solenoid coils of a first magnetic sense, and being retained in the first position after termination of the latching current pulse by residual magnetism until released by a releasing current pulse in one of the solenoid coils of a second magnetic sense opposite the first magnetic sense;
a valve member;
the plurality of solenoid actuators being disposed and configured so that the spring in each solenoid actuator will cause a respective force on the valve member when the respective moving member is released;
the forces exertable on the valve member by each spring being a respective one of a relative force in a binary sequence of relative forces.

16. The proportional valve of claim 15 wherein when the respective moving member is released, the force of the respective spring is communicated directly to the valve member, the force of each spring being a respective one of a relative force in a binary sequence of relative forces.

17. The proportional valve of claim 15 wherein the solenoid actuators are disposed to controllably apply a respective spring force to a hinged member, the hinged member being disposed to apply force to the valve member and hinged about a hinge axis perpendicular to and spaced from an axis of the valve member, the solenoid actuators being distributed from the hinge axis by distances in a binary sequence of relative distances, the force that may be exerted on the valve member by each spring being equal.

18. The proportional valve of claim 15 wherein the solenoid actuators are disposed to controllably apply a respective spring force to a hinged member, the hinged member being disposed to apply force to the valve member and hinged about a hinge axis perpendicular to and spaced from an axis of the valve member, the solenoid actuators being distributed from the hinge axis by distances not all in a binary sequence of relative distances.

19. The proportional valve of claim 15 wherein the solenoid actuators are disposed in a side by side relationship.

20. The proportional valve of claim 15 wherein at least some of the solenoid actuators are disposed in a stacked relationship, the moving members of the actuators being disposed relative to a common actuator shaft to apply the respective spring force to the common actuator shaft when the respective moving member is released and to not apply the respective spring force to the common actuator shaft when the respective solenoid actuator is latched.

21. The proportional valve of claim 15 further comprising an adjustment in each solenoid actuator for adjusting the respective spring force.

22. The proportional valve of claim 15 further comprised of a controller, the controller configured to receive digital forcer control inputs and release solenoid actuators to provide forces on the valve member approximating the forces corresponding to the digital control inputs.

23. The proportional valve of claim 22 wherein the controller is configured to provide releasing current pulses to respective solenoid actuators to release the respective moveable members to provide forces on the valve member approximating the forces corresponding to the digital control inputs, and to provide latching current pulses as required to latch the remaining solenoid actuators.

24. The proportional valve of claim 23 wherein the controller is configured to pulse respective solenoid actuators to provide releasing pulses to the respective moveable members to provide forces on the valve member exceeding the forces corresponding to the digital control inputs by at least a fraction of the least significant relative force, and to apply a current to at least one of the solenoid actuators to overcome the difference between the forces provided and forces corresponding to the digital control inputs.

25. The proportional valve of claim 23 wherein the controller is configured to pulse respective solenoid actuators to release the respective moveable members to provide forces on the valve member exceeding the forces corresponding to the digital control inputs by at least more than the least significant relative force, and to apply a current to at least one of the solenoid actuators to overcome the difference between the forces provided and forces corresponding to the digital control inputs.

26. The improvement of claim 15 wherein the residual magnetism is augmented by a small holding current relative to the current in the latching current pulse.

27. The improvement of claim 15 wherein the residual magnetism is not augmented by a holding current.

* * * * *